(12) United States Patent
Montoya

(10) Patent No.: US 6,385,959 B1
(45) Date of Patent: May 14, 2002

(54) GAS TURBINE ENGINE WITH INCREASED FUEL EFFICIENCY AND METHOD FOR ACCOMPLISHING THE SAME

(76) Inventor: César Aguilera Montoya, 3714 N. Muscatel Ave., Rosemead, CA (US) 91770

( * ) Notice: Subject to any disclaimer, the term of this patent is extended or adjusted under 35 U.S.C. 154(b) by 0 days.

(21) Appl. No.: 09/717,603

(22) Filed: Nov. 21, 2000

Related U.S. Application Data

(63) Continuation of application No. 09/379,671, filed on Aug. 24, 1999, now abandoned.

(51) Int. Cl.[7] ................................................. F02C 3/14
(52) U.S. Cl. ................... 60/39.03; 60/39.15; 60/39.161
(58) Field of Search ............................. 60/39.03, 39.15, 60/39.161, 39.17

(56) References Cited

U.S. PATENT DOCUMENTS

| | | | |
|---|---|---|---|
| 2,526,941 A | * 10/1950 | Fishbein | 60/39.15 |
| 2,651,911 A | * 9/1953 | Sterland | 60/39.15 |
| 2,930,190 A | * 3/1960 | Rogers | 60/39.15 |
| 3,867,813 A | 2/1975 | Leibach | 60/225 |
| 4,085,583 A | 4/1978 | Klees | 60/204 |
| 4,222,235 A | 9/1980 | Adamson et al. | 60/226 |
| 5,313,782 A | 5/1994 | Frutschi et al. | 60/39.17 |
| 5,481,865 A | 1/1996 | Frutschi | 60/39.03 |
| 5,943,856 A | 8/1999 | Lillibridge et al. | 60/262 |

* cited by examiner

*Primary Examiner*—Louis J. Casaregola
(74) *Attorney, Agent, or Firm*—Christie, Parker & Hale, LLP

(57) ABSTRACT

An engine having a casing and a compressor disposed within and rotatably coupled to the casing for generating pressurized gas. A primary combustion chamber disposed within the casing downstream of the compressor receives a primary portion of the gas generated by the compressor, and a secondary combustion chamber disposed within the casing downstream of the compressor receives a secondary portion of the gas generated by the compressor. Exhaust gases generated by the primary combustion chamber are applied to low and high pressure turbines located downstream of the primary combustion chamber. Exhaust gases generated by the secondary combustion chamber are only applied the low pressure turbine located downstream of the secondary combustion chamber.

19 Claims, 14 Drawing Sheets

FIG.8A

|  | EFFICIENCY OF LP COMPRESSOR | EFFICIENCY OF HP COMPRESSOR | FUEL CONSUMPTION | THRUST |
|---|---|---|---|---|
| CONVENTIONAL ENGINE | 86% | 92% | 17,720 LBF/HR | 47,000 LBS |
| ENGINE OF PRESENT INVENTION | 90% | 88% | 17,720 LBF/HR | 48,300 LBS |

FIG.8B

|  | EFFICIENCY OF LP COMPRESSOR | EFFICIENCY OF HP COMPRESSOR | FUEL CONSUMPTION | THRUST |
|---|---|---|---|---|
| CONVENTIONAL ENGINE | 86% | 92% | 17,720 LBF/HR | 47,000 LBS |
| ENGINE OF PRESENT INVENTION | 87% | 87% | 16,490 LBF/HR | 47,000 LBS |

GAS TURBINE ENGINE WITH INCREASED FUEL EFFICIENCY AND METHOD FOR ACCOMPLISHING THE SAME

CROSS-REFERENCE TO RELATED APPLICATION(S)

This application is a continuation of U.S. patent application Ser. No. 09/379,671 filed on Aug. 24, 1999 (abandoned), the disclosure of which is fully incorporated herein by reference.

FIELD OF THE INVENTION

The present invention is directed to a gas turbine engine with increased fuel efficiency, and more specifically, to a gas turbine engine having a second combustion chamber that receives high pressure gas from the compressor and to a method for increasing the efficiency of the engine.

BACKGROUND

Gas turbine engines are well-known and are mostly noted for their use in aircraft. Gas turbines are heat engines that use air as a working medium and mechanical shaft horsepower to generate a propulsive force called thrust. In atypical gas turbine engine, atmospheric air is drawn into the engine by a fan disposed at its inlet. A primary portion of the air received by the inlet is passed through a core portion of the engine while a secondary portion of the inlet air passed through a bypass duct surrounding the core portion of the engine to cool the engine.

The primary portion of air received by the core engine is passed through a series of compressors, where it is compressed. The compressors are driven by a pair of co-axial shafts connected to a series of turbines displaced downstream of the compressors. A combustion chamber positioned downstream of the compressors and upstream of the turbines receives the compressed air and fuel. In the combustion chamber, the air is mixed with the fuel, creating an air-fuel mixture that is ignited to generate exhaust gases having high energy. The exhausts gases are then passed and partially expanded through a series turbines that convert the exhaust gases's high pressure energy into mechanical energy to drive the co-axial shafts driving the compressors upstream. The exhausted gases generated by the engine core portion are joined with the air passed by the engine core portion and are then accelerated as they pass through an exhaust nozzle located downstream of the turbines. These gases are then exhausted from the exhaust nozzle into the atmosphere in the form of thrust. Consequently, as the speed of the ambient air entering the inlet increases, the thrust generated by the engine also increases.

Performance of gas turbine engines are largely based on the amount of thrust the engines generate in comparison to their weight (thrust-to-weight ratio), as well as the amount of fuel the engine consumes. Due to the rising cost of fuel there is a need for an improved engine that efficiently uses the high pressure energy generated by the compressors to provide increased thrust, while requiring less fuel consumption.

SUMMARY OF THE INVENTION

The present invention is an improved fuel efficient gas turbine engine and method of accomplishing the same, increasing the fuel efficiency of gas turbine engines. Gas turbine engines, constructed according to principles of this invention, generally comprise a primary combustion chamber for receiving a primary portion of high pressure air passing from a high pressure compressor, and a secondary combustion chamber for receiving a secondary portion of high pressure air passing from the high pressure compressor. The primary combustion chamber is configured such that it passes exhaust gases to drive high and low pressure turbines located downstream of the primary combustion chamber. The secondary combustion chamber is configured to pass exhaust gases to only drive the low pressure turbine. A mechanical controller is provided to control the amount of high pressure air passing into the secondary combustion chamber.

The mechanical controller consists of a central control unit and a manual fluid pressure control unit that is coupled to a top portion of the central control unit. The central control unit is generally constructed as a box having a fluid reservoir and a piston well disposed within its interior. The fluid reservoir is constructed to receive fuel passing from a high pressure fuel line connected to a base portion of the box. The high pressure fuel confined in the fluid reservoir generates in pressure forces within the box's interior. The piston well is constructed in communication with the fluid reservoir and confines a piston that translates under the influence of the pressure forces between a first position and a second position. The piston is coupled to a linkage that actuates a slider positioned at an inlet to the secondary combustion chamber. The slider moves in response to the translation of the piston to block or unblock the inlet, varying the amount of high pressure air passing into the secondary combustion chamber.

BRIEF DESCRIPTION OF THE DRAWINGS

These and other features and advantages of the present invention will be better understood by reference to the following detailed description when considered in conjunction with the accompanying drawings, wherein:

FIGS. 8A and 8B are tables comparing the performance of a conventional gas turbine engine with a gas turbine engine incorporating a secondary combustion chamber according to the principles of this invention;

DETAILED DESCRIPTION OF EXAMPLE EMBODIMENTS

ENGINE

Figure 1:
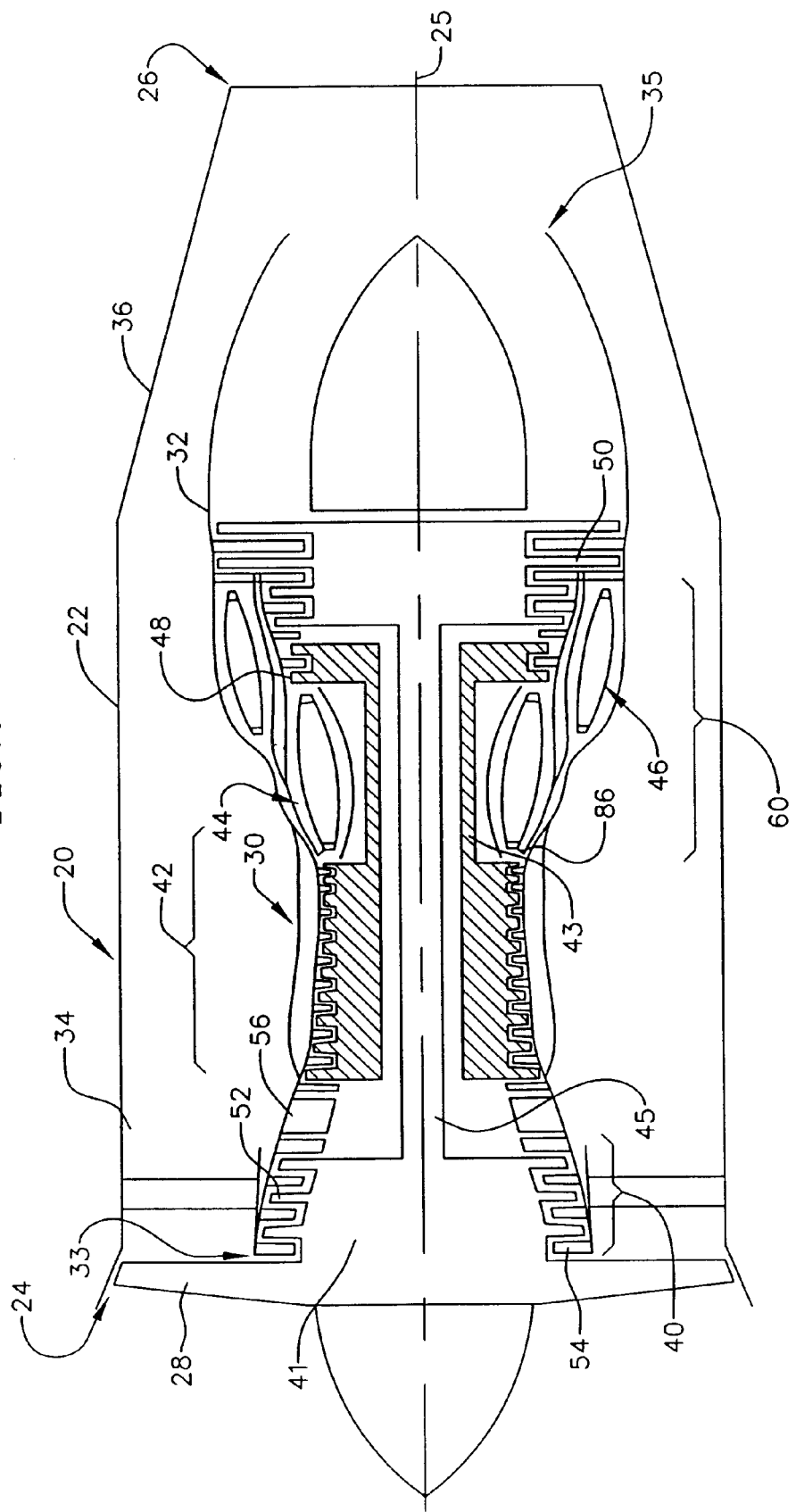
FIG. 1 is a cross-sectional side view of a first embodiment gas turbine engine incorporating a secondary combustion chamber according to the principles of this invention.

FIG. 1 shows an exemplary embodiment engine of the present invention denoted by 20. The engine is shown as a dual-shaft, dual-flow engine having a supporting structure in the form of a fan housing 22. The fan housing is generally annular and symmetrical about a central axis 25. The fan housing 22 includes at a first axial end an inlet 24 that receives air from the surrounding atmosphere, and at an opposite axial end, downstream from the inlet, an outlet 26 that passes exhaust gases from the engine in the form of thrust. The fan housing also includes a core engine 30 that is disposed axially within the housing about the central axis. The core engine is surrounded by an annular engine casing 32 that is coaxially located within the fan housing about the central axis 25.

A fan 28 disposed within the fan housing 22 upstream of the core engine 30 draws atmospheric air into the inlet and generates axial fan air flow. An annular bypass duct 34 defined between the fan housing and the annular engine casing 32, receives at least a portion of the axial fan air flow from the fan. The bypass duct surrounds the core engine and extends axially downstream from the inlet 24, terminating at a common nozzle 36 located just upstream of the outlet 26.

The engine casing consists of an engine inlet 33, positioned downstream of the inlet 24, and exit 35, positioned upstream of the outlet 26. An exemplary embodiment core engine 30 includes a low pressure compressor 40 disposed proximal to the engine inlet and a high pressure compressor 42 positioned partially downstream of the low pressure compressor. The engine also includes a primary annular combustion chamber 44 and secondary annular combustion chamber 46 disposed within a diffuser section 60 of the engine downstream of the high pressure compressor. The primary and secondary combustion chambers are symmetrically positioned about the central axis 25 juxtaposed relative to each other with the second combustion chamber preferably being located at least partially downstream from the first combustion chamber. A first annular wall 82 symmetrically defined about the central axis between the primary and secondary combustion chambers extends axially between the high pressure compressor and a portion of the low pressure compressor. A second annular wall 62 symmetrically disposed about the about the central axis 25 between the primary combustion chamber and the primary drive shaft 43 extends axially between the high pressure compressor and the high pressure turbine 48 to define a primary annular flow path 83 between the first and second annular walls. A secondary annular flow path 84 is defined between the first annular wall and the engine casing 32.

The core engine further includes a high pressure turbine 48 disposed downstream from the primary combustion chamber. Moreover, the core engine includes a low pressure turbine 50 positioned at least partially downstream from the secondary combustion chamber, downstream from the high pressure turbine, and upstream of the engine exit. The high pressure compressor is coupled to the high pressure turbine by the primary drive shaft 43 axially extending about the central axis 25, while the low pressure compressor is connected to the low pressure turbine by a secondary axial drive shaft 45 that is concentric with the primary drive shaft.

Air entering the core engine 30 is first received by the low pressure compressor 40 located at the engine inlet 33. The low pressure compressor is preferably multi-staged, wherein a stage 56 comprises the combination of a moving blade or rotor 52 and a fixed vane or stator 54. The stators are generally airfoil shaped in cross-section and extend radially inward from the engine casing 32 towards the secondary axial drive shaft 45. The moving blades or rotors are generally airfoil shaped in cross-section and extend radially outward from a low pressure compressor hub 41 extending from the secondary axial drive shaft. The low pressure compressor upstream stators and rotors have a greater length than the downstream stators and rotors, respectively. The low pressure compressor is the larger diametrically of the two compressors and provides initial compression of the axial fan air flow, and transmits the compressed air to the high pressure compressor.

Located downstream of the low pressure compressor 40 is the high pressure compressor 42. Separated from the low pressure compressor by a spacer blade 56 extending radially inward from the engine casing 32, the high pressure compressor is preferably multi-staged and driven by the high pressure turbine via the first drive shaft 43. The stators and rotors of the high pressure compressor operate in a fashion similarly to that of the low pressure compressor. The high pressure compressor is the smaller diametrically of the two compressors and is used to compress further the air delivered from the low pressure compressor and reduce the mas flow rate of the inlet air before it is fed into a diffuser section 60 which houses the combustion chambers. Similar to the low pressure compressor, the high pressure compressor upstream stators and rotors have a greater length than the downstream stators and rotors, respectively.

Figure 2B:
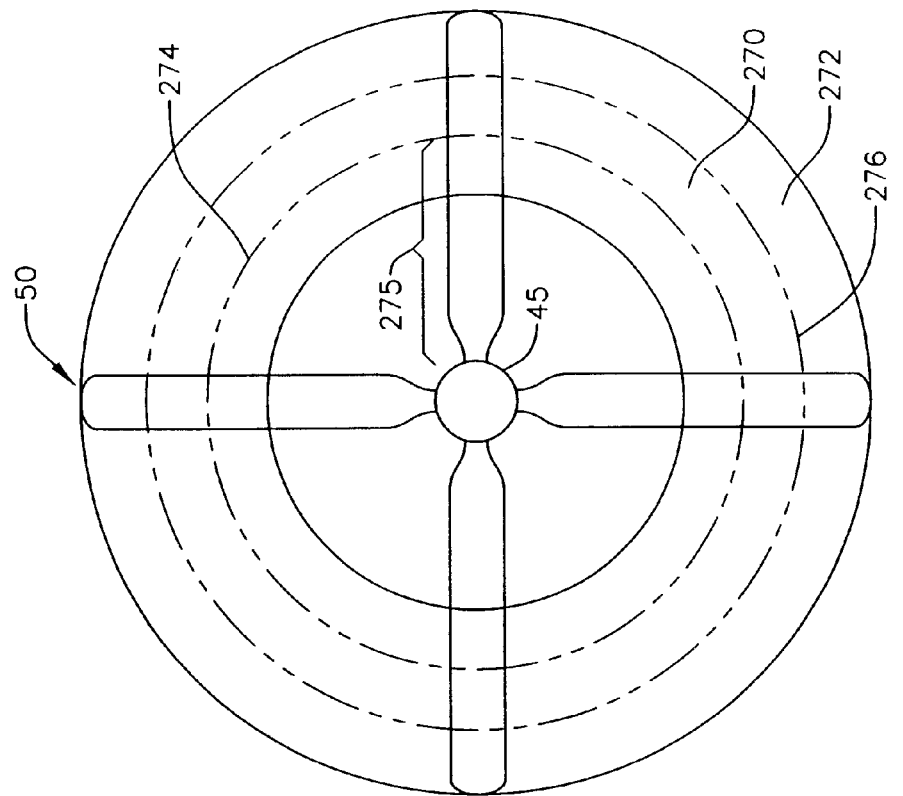
FIGS. 2A and 2B are a fragmentary cross-sectional side view and a simplified plan view, respectively, of the diffuser section and the radial profile of the low pressure turbine blades of the engine in FIG. 1.
Figure 2A:
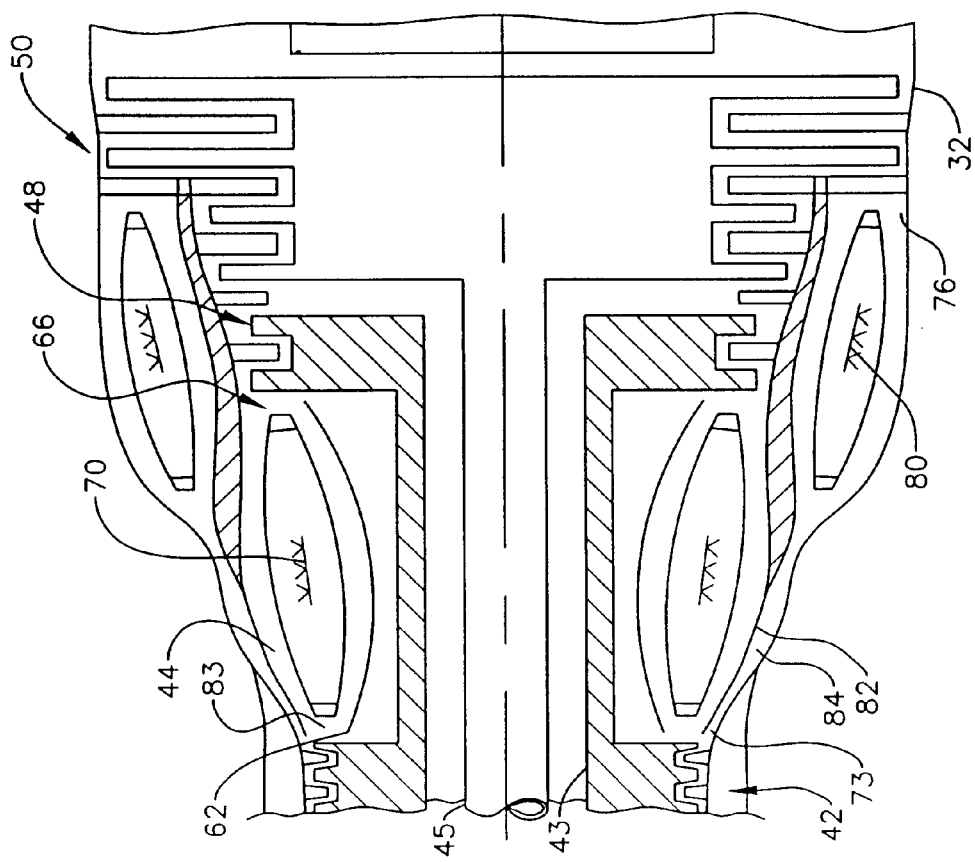

Referring to FIG. 2A, the compressed air passing from the high pressure compressor enters the diffuser section 60 where the primary and secondary combustion chambers 44 and 46 are confined. In the diffuser section, the compressed air passing from the high pressure compressor 42 flows though the primary flow path 83 leading to the primary combustion chamber 44 or the secondary flow path 84 leading to the secondary combustion chamber 46.

Air passing into the primary combustion chamber 44 is mixed with fuel to an appropriate mixing ratio. The fuel is preferably gasoline, but any type of conventional fuel may be used, for example, Kerosene, PJ-4, H2O steam, hydrogen liquid, hydrogen gas and oxygen gas. The fuel is provided to the combustion chamber by fuel injectors (not shown). Igniters 70 coupled to the primary combustion chamber ignite the air-fuel mixture, which in turn combusts and generates exhaust gases that exit the primary combustion chamber through an outlet 66 of the primary annular flow path 83 and enter the high pressure turbine.

Compressed air passing from the high pressure compressor 42 also flows though the secondary annular flow path 84 to the secondary combustion chamber 46. There the air is mixed with fuel provided by fuel injectors (not shown) and ignited by igniter 80 to generate exhaust gases that exit the secondary combustion chamber through an outlet 76 of the secondary annular flow path 84 and enter the low pressure turbine. The amount of air ingested by the secondary combustion chamber is regulated at an inlet 86 of the secondary annular flow path 84 by a plurality of inlet orifices 86 having a vane (shown in FIG. 6) that is variably adjusted by a controller (shown in FIG. 3), as will be described below.

The high pressure turbine 48, located aft of the outlet 66 of the primary annular flow path, receives exhaust gases generated by the primary combustion chamber 44. Similar to the low and higher pressure compressors, the high pressure turbine comprises a series of fixed stators having an airfoil shaped cross-section and extending radially inward from the engine casing. The high pressure turbine also includes a series of rotors having an airfoil shaped cross-section and extending radially outward from the primary drive shaft 43. The high pressure turbine is the smaller diametrically of the two turbines and drives the high pressure compressor. As the exhaust gases passing from the primary combustion chamber impacts the turbine blades or rotors, energy is abstracted from the exhaust gases causing the turbine to rotate and thus generate mechanical torque to drive the fist axial drive shaft 43 and the low pressure compressor coupled to the drive shaft. The air passing through the high pressure turbine is expanded, following a flow path increasing in diameter, as the upstream stators and rotors have a shorter length than the downstream stators and rotors, respectively. The air passing from the high pressure turbine 48 next enters the low pressure turbine 50.

Air passing from the high pressure turbine 48 is received by the low pressure turbine 50. The low pressure turbine receives exhaust gases passing from the high pressure turbine and gases generated in the secondary combustion chamber 46. The stators and rotors of the low pressure turbine operate in a fashion similarly to that of the high pressure turbine. The low pressure turbine is the larger diametrically of the two turbines. Gases passing through the low pressure turbine cause the low pressure turbine to rotate and thus rotate shaft 45 and the low pressure compressor coupled to the shaft 45. Exhaust gases passing from the low pressure turbine are then passed through the core engine exit and are exited through the engine nozzle 36.

Referring to FIG. 1, the nozzle 36 is located in the aft section of the fan housing 22 downstream of the engine exit 35. The nozzle is a distinct feature of the engine and is defined by the aft portion of the fan housing deceasing in diameter and terminating at the outlet 26. The nozzle functions to reunite the air passing through the bypass duct 34 with the exhaust gases from the core engine 30 and to further accelerate the combined flows through the engine outlet. The nozzle may designed to a predetermined exit size according the amount of thrust desired.

CONTROLS

The present invention provides an aircraft pilot the ability to regulate the amount of high pressure air received by the secondary combustion chamber. The present invention includes a central control unit which acts by mechanical means to adjust a vane that regulates the passage of high pressure air through the inlet orifices 86 located at the inlet 73 of the secondary annular path 84. Although the example embodiment disclosed herein describe a control unit using mechanical means, it should be understood by one skilled in the art that the passage of air though the inlet 73 may be adjusted by adjusting the position of a vane by various electrical, mechanical or electromechanical means, as for example, by a pneumatic actuator triggered by an electrical signal.

Figure 3:
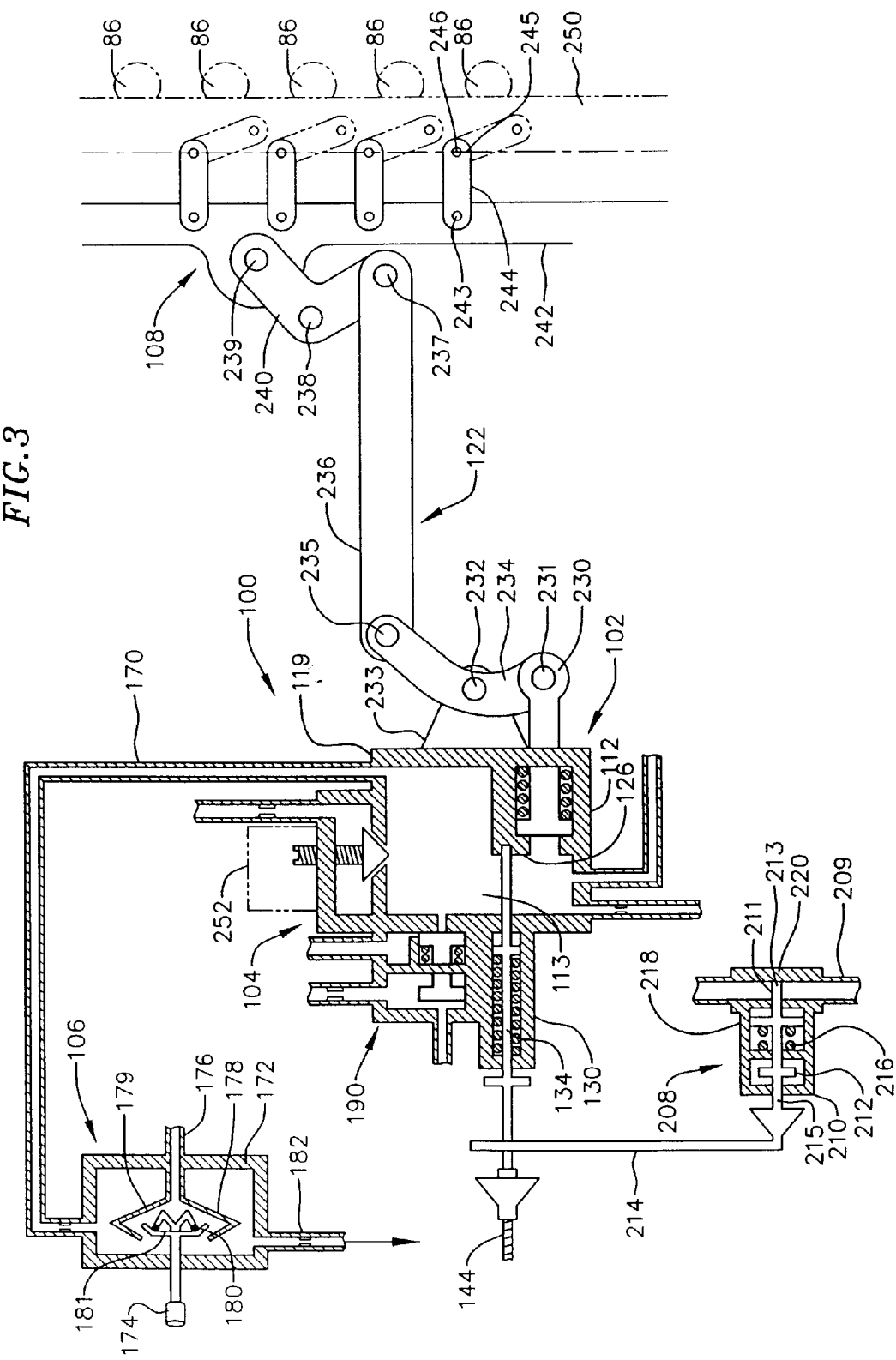
FIG. 3 is a simplified plan view of a mechanical controller used in conjunction with a secondary combustion chamber constructed according to principles of this invention.

In a first exemplary embodiment, the adjustable vane 250 is controlled by a mechanical controller 100 as shown in FIG. 3. This system consists of a central control unit 102, a manual fluid pressure control unit 104 coupled to a top portion of the central control unit, a hydraulic transmitter 106 coupled to the central control unit via a fluid line 170, and a translator 144 coupled to the control unit to actuate various components within the central control unit. The system also includes a vane actuator 108 coupled to the central control unit by a linkage.

Figure 4:
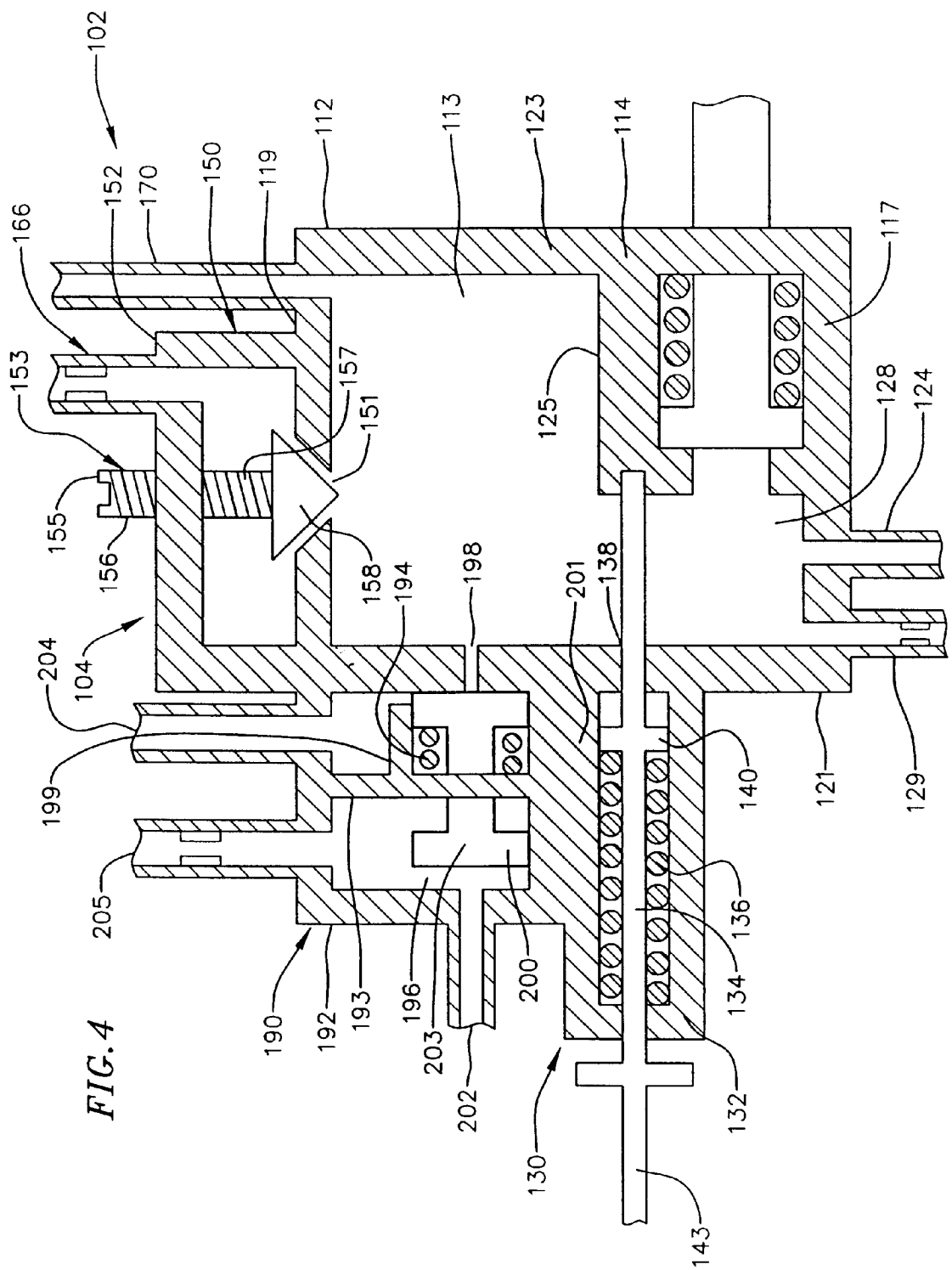
FIG. 4 is a fragmentary cross-sectional view of the central control unit of the mechanical controller in FIG. 3.

Referring to FIG. 4, the central control unit 102 preferably comprises a box 112 having a base 117, a top 119 and sidewalls 121 and 123 that define a fluid reservoir 113 within interior. The box is preferably rectangular but may be constructed to any suitable size or configuration. The box is constructed to receive a high pressure fuel line 124 attached to the base that passes fuel from a high pressure fuel pump into the fluid reservoir 113 to pressurize the box. The pressure forces generated within the box are then used to actuate various mechanical components mechanical controller which adjust the vane of the inlet orifices at the inlet 85.

Figure 5:
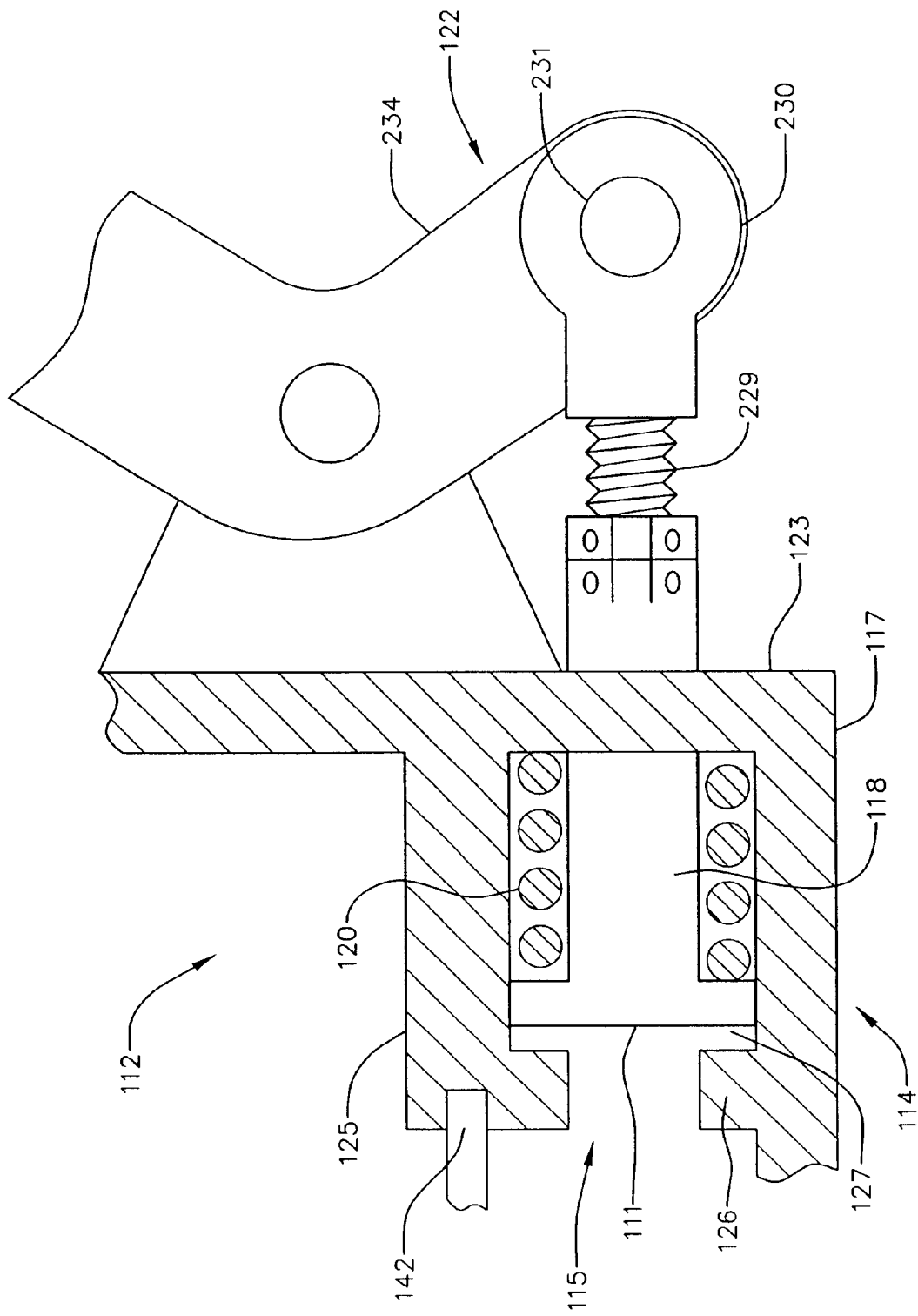
FIG. 5 is a fragmentary cross-sectional view of the piston well of the central control unit in FIG. 4.

The box 112 includes a piston cell 114 located in a lower corner of the box adjacent the sidewall 123 and base 117. As shown in FIG. 5, the piston cell consists of an outer wall 125 and side panel 126 fixed in relation to the sidewall 123 and the base to form a piston well 127 within the cell's interior. The side panel 126 includes a fuel passage 115 in communication with the fluid reservoir 113 and is spaced part from the box sidewall 121 to define a reservoir entrance 128 therebetween (see FIG. 4). The reservoir entrance is located along the base proximal the high pressure fuel line to pass fuel from the high pressure line into the fuel reservoir.

The piston well 127 confines a piston 118 consisting of a shaft and a piston head 111 that operates by pressure forces against a spring bias 120 that urges the piston head towards a first position proximate the side panel 126. The piston head is preferably configured to provide a dynamic seal between the piston head and the interior walls of the piston cell. The shaft of the piston extends through a fluid sealed opening in the sidewall 123 and is operatively connected to a linkage 122 that controls the vane actuator 108 (shown in FIG. 3). When pressure forces acting on the piston head are sufficient, the piston translates away from the side panel 126 against the spring bias. As a result, the piston actuates the linkage 122 in a first direction to move the vane into a position to block the inlet orifices 86 and regulate the amount of high pressure air passing into the secondary combustion chamber, as will be discussed in detail later.

Similarly, when the pressure forces acting against the piston head are not sufficient to overcome the spring bias, the spring bias urges the piston back towards its first position proximate the side panel 126. In this instance, the piston actuates the linkage 122 in an opposite direction to cause the vane 250 to unblock the inlet orifices 86 and allow an increased amount of high pressure air to pass into the secondary combustion chamber.

Referring to FIG. 3, the linkage 122 is a four bar linkage comprising a first bar 230 having a threaded portion 229 that is threaded to the piston shaft and rotatably coupled to a second bar 234 via an eyelet 231 opposite the threaded portion. The second bar is substantially curved in shape and configured such that it pivots about a first pivot 232 centrally disposed along its length. The first pivot is carried by a bracket 233 outwardly extending from the sidewall 123 of the box 112. The second bar is rotatably coupled to a third bar 236 at an end 235 of the second bar opposite the end where it is connected to the eyelet.

The third bar is rotatably coupled to a fourth bar 240 at an end 237 of the third bar opposite end 235. The fourth bar is curved in shape and configured to pivot about a second pivot 238 centrally disposed along its length. The fourth bar is a terminal member of the linkage and is rotatably connected to the vane actuator 108 at end 239 of the fourth bar opposite end 237.

Figure 6A:
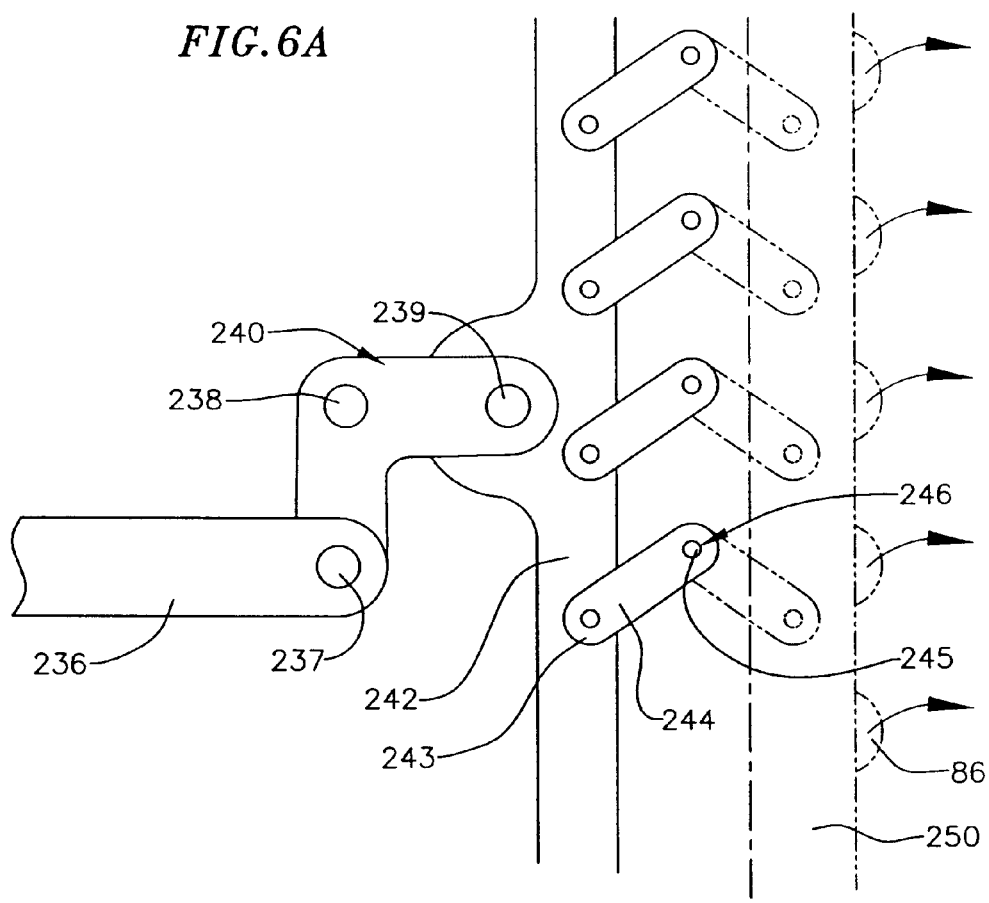
FIGS. 6A and 6B are fragmentary top and cross-sectional side views, respectively, of an adjustable vane used in conjunction with a secondary combustion chamber constructed according to principles of this invention disposed in the diffuser section of the engine in FIG. 1.
Figure 6B:
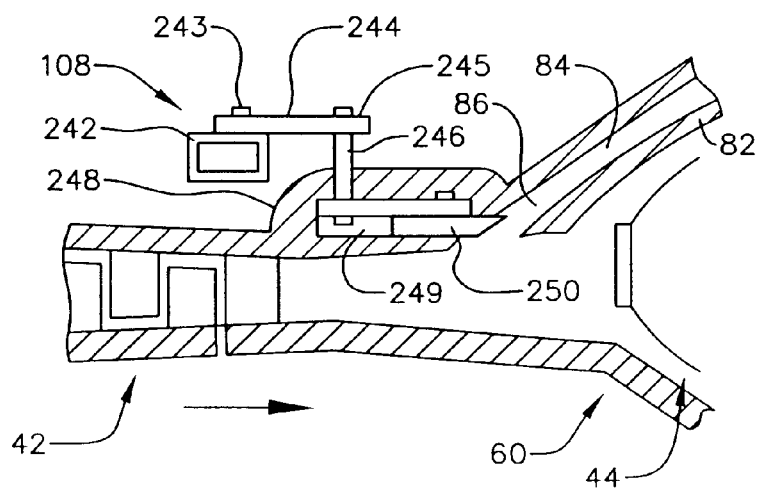

As shown in FIGS. 3, 6A and 6B, the vane actuator 108 consist of a vane translator 242, which is rotatably connected to the fourth bar 240 at end 239, a vane 250, and a plurality bar members 244 that are rotatably coupled between the vane translator at a first end 243 and the vane at a second end 245. The vane translator is preferably a generally rectangular tube-like structure that is translated under the direction of the linkage 122. The vane is a slender annular body that is disposed within a groove 249 within the diffuser section 60 (shown in FIG. 6B) and positioned to regulate the amount of secondary high pressure air passing through the inlet orifices 86 to the secondary combustion chamber. The vane is connected to the bar members by a rod 246 extending from the second end of the members to a slider 248 disposed within the groove 249 (shown in FIG. 6B). The slider is slender plate that is connected the rod 246 at a first end and supports the vane 250 at an opposite end. The groove confines the translation of the slider to an axial direction.

The position of the vane 250 relative to the inlet orifices 86 is determined by the vane translator 242, which is operatively coupled to the vane via the bar members 244. The bar members are rotatably coupled between the vane translator and the vane such that they partially pivot relative to the vane translator, but is fixed relative to the slider 248, when the vane translator translates from a first position (shown in FIG. 3) to a second position (shown in FIG. 6B), this way, the vane translator can move in accordance with the linkage, while the slider translates along its confined axial path.

Referring to FIG. 3, in accordance with the first example embodiment, when the pressure forces generated within the piston well 127 are sufficient to translate the piston 118 in a first direction away from the side panel 126, the first rod 230 is translated in the first direction and the second rod 234 is rotated counterclockwise about the first pivot 232. The counterclockwise rotation of the second bar causes the third bar to translate axially in a second direction opposite the first direction. The axial translation of the third bar causes the fourth bar to rotate clockwise about the second pivot 238 moving the vane translator 242 and the vane 250, via the bar members 244, in the first direction to block a portion of the inlet orifices 86 from receiving air. The translation of the vane relative the inlet orifices effectively vary the orifice diameters, or the area in which air may pass from the high pressure compressor into the second combustion chamber.

In a similar fashion, when the pressure forces on the piston 118 are insufficient to overcome the spring 120 bias, the piston is translated in a second direction towards the side panel 126 and the linkage operates in conjunction with the component of the vane actuator 108 to move the vane in the second direction, opening the effective inlet orifice area and allowing a sufficient amount of high pressure air to pass to the second combustion chamber.

Moving back to the central control unit 102, fuel passing from the high pressure line 124 into the fluid reservoir is governed by a fluid regulator 130 outwardly extending from the sidewall 121 of the box 112, as shown in FIG. 4. In an exemplary embodiment, the fluid regulator is an enclosure 132 that confines a compression spring 136 and a central portion of a gate 134. The gate is a plate having a central portion that is slidable within the enclosure between an "open" position (shown in FIG. 7) and a "closed" position (shown in FIG. 3). A first end 141 of the gate is configured to be received by the box through a slit 138 along the sidewall 121. The bias of the compression spring 136 acts against a bearing plate 140 coupled to the gate to "close" the gate by engaging the first end 141 of the gate with a seal 142 (shown in FIG. 5) located along the top panel 125 of the piston cell 114.

In the "closed" position the gate 134 blocks the high pressure fuel's access to the fluid reservoir to confine the fuel within the entrance adjacent to the piston cell. As such, the high pressure fuel pressurizes the entrance 128, and following a path of least resistance, enters the fuel passage to fill the piston well. As the high pressure fuel fills the piston well, pressure forces are generated and act on the face of the piston head to urge it against the spring bias. Once the pressure forces are sufficient in magnitude, the piston translates away from its first position juxtaposed the side panel. A bleed line 129 connected to the base of the box, adjacent the high pressure line 124, relieves some of the pressure building in the entrance 128 and the piston well, and returns the escaped fuel to a high pressure fuel pump (not shown) to maintain the high pressure fuel line and prohibit air bubbles from forming in the high pressure line while the engine is running.

Figure 7:
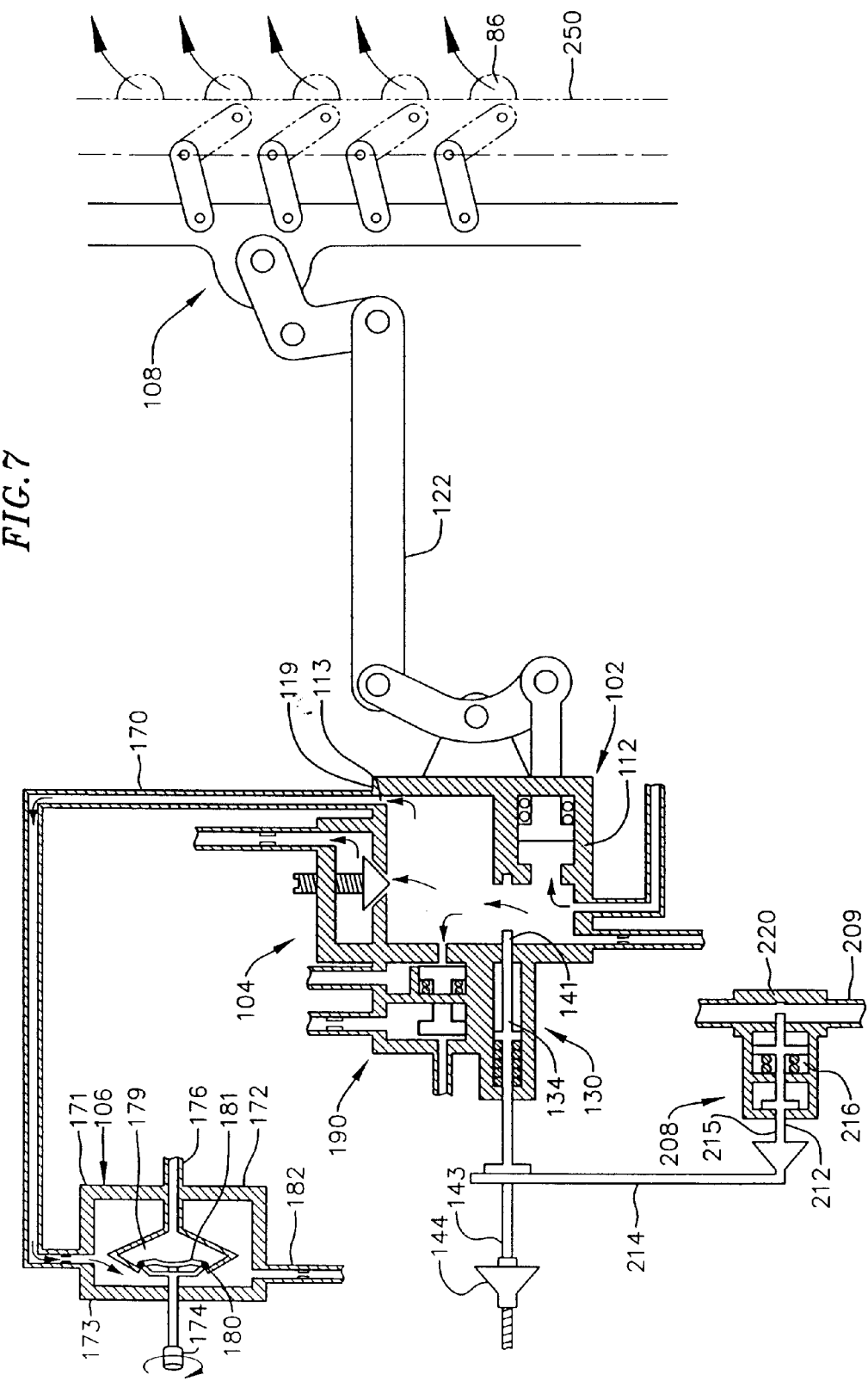
FIG. 7 is another simplified plan view of the mechanical controller in FIG. 3.

In the "open" position, the first end 141 of the gate 134 is disengaged from the seal against the bias of the compression spring 130 by the translator 144 connected to a second end 143 opposite the first end of the gate (shown in FIG. 7). In the "open" position, the high pressure fuel is allowed to pass into the fluid reservoir 113 and the build-up pressure within the entrance 128 and the piston well are relieved. As such, the pressure forces acting on the piston are reduced. Once the pressure forces acting on the face of the piston head are reduced to a magnitude that is not sufficient to overcome the piston spring bias, the spring urges the piston head back towards its first position juxtaposed the side panel.

Figure 9A:
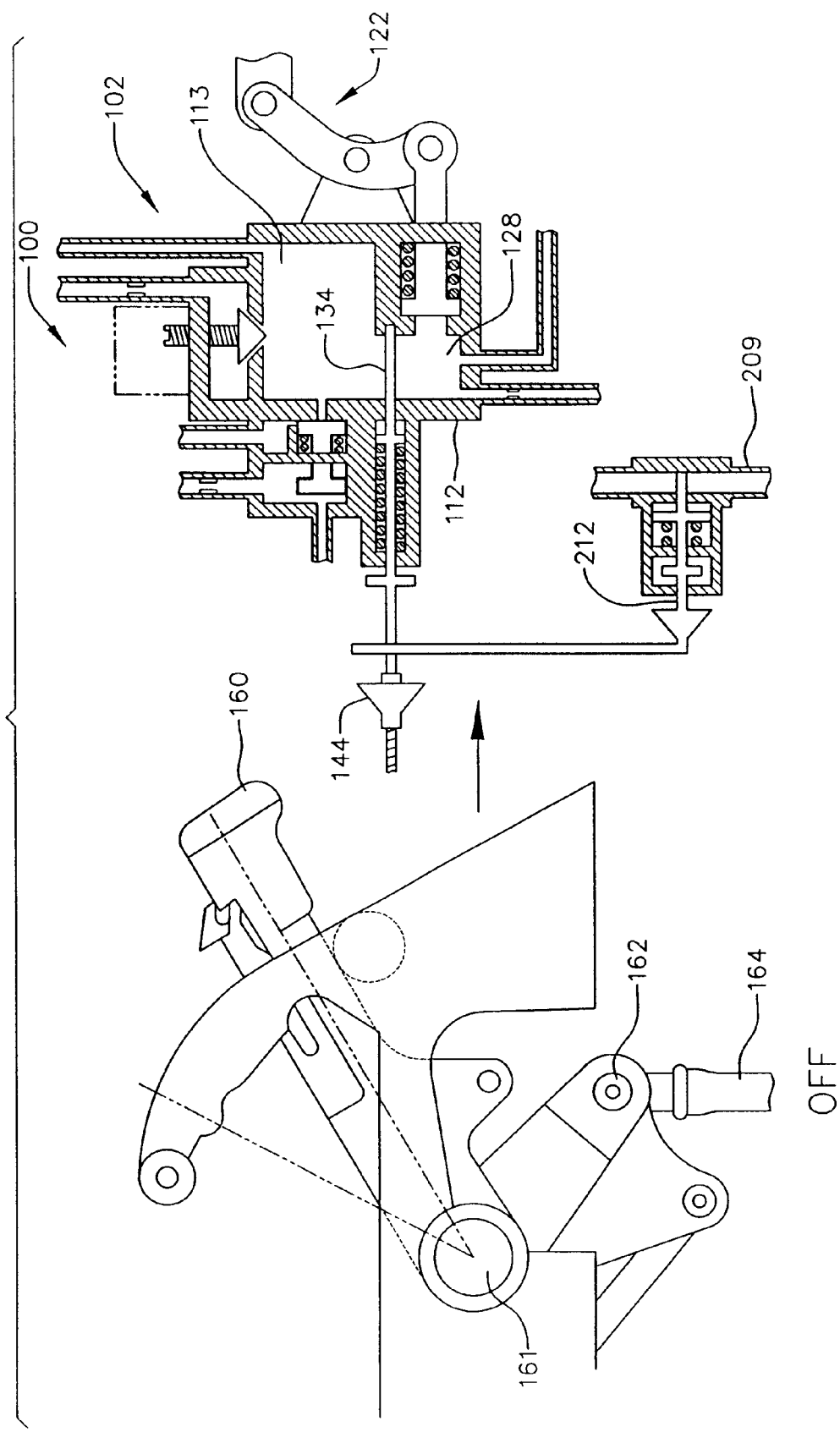
FIGS. 9A, 9B and 9C are simplified plan views of the describing the various operating modes of mechanical controller in FIG. 3.
Figure 9B:
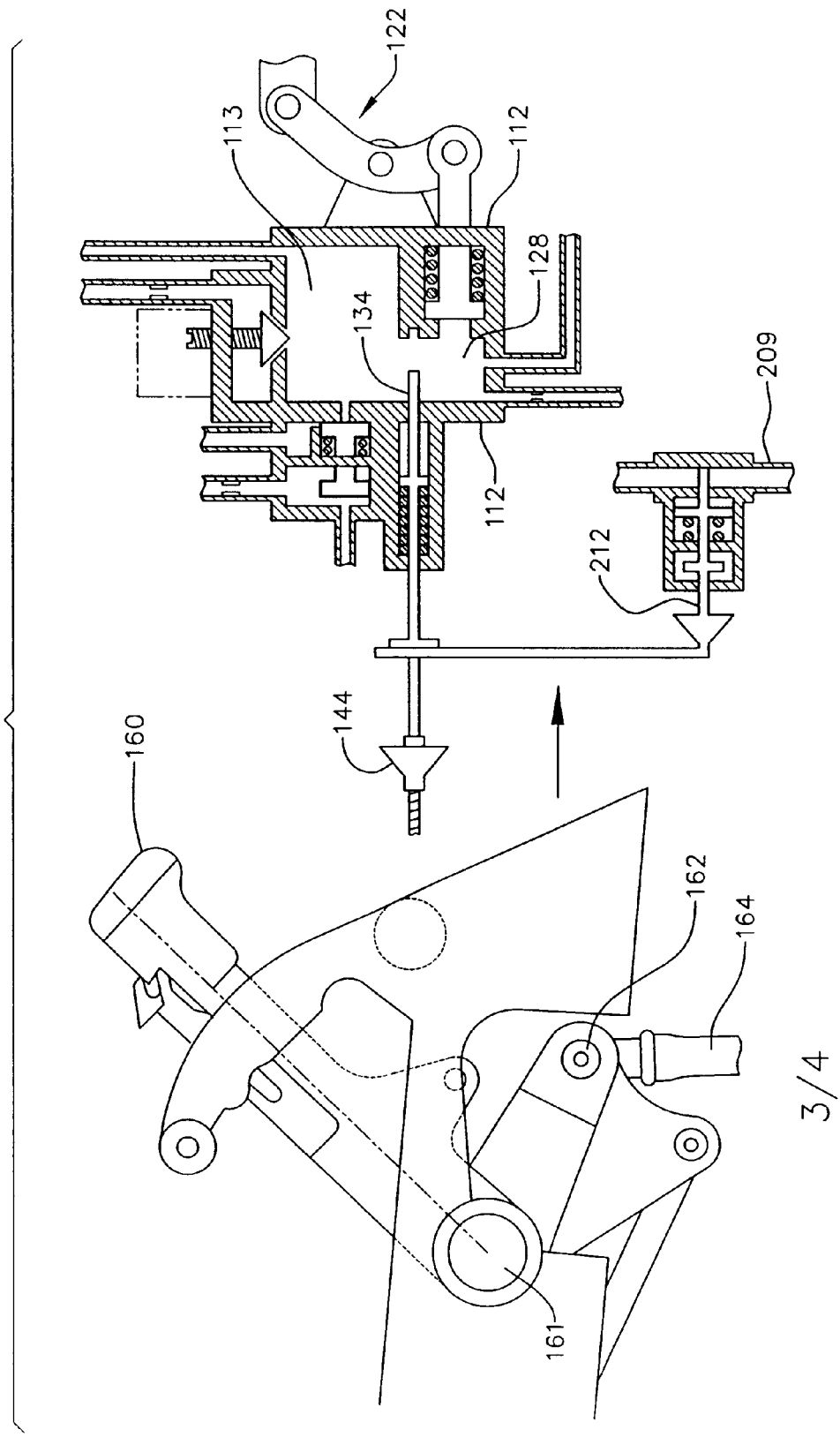
Figure 9C:
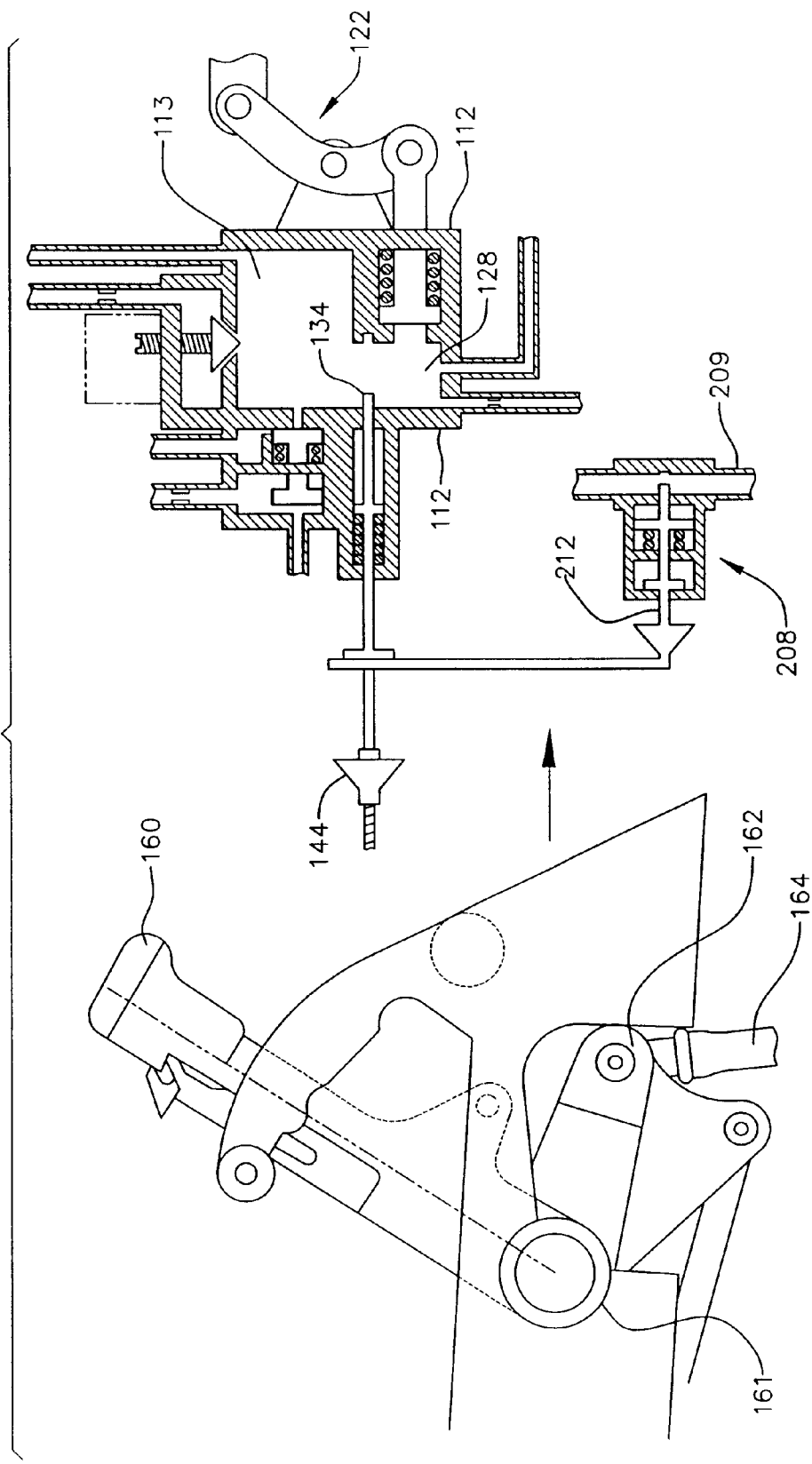

The translator 144 provides the mechanical means whereby the aircraft pilot controls the position of the adjustable vane relative to the inlet orifices. As shown in FIGS. 9A through 9C, a control lever 160 rotatable about a pivot 161 and operable in three positions or modes is provided in the cockpit of the aircraft, as will be discussed later. The control lever is connected to a crank 162 and arm 164 that are moveable when the pilot engages the level to rotate about the pivot. When the lever is rotated counter clockwise, the arm 164, which is coupled to the translator 144, is actuated upwards and translates the translator in a first direction away from the box 112. The translation of the translator acts to open the gate 134 from its closed position. As such, fuel is now able to pass from the entrance 128 to the fluid reservoir 113, reducing the fluid pressure in the piston well and the pressure forces acting on the piston. This in turn opens the adjustment vane.

In a like manner, if the control lever is rotated clockwise, the translator is directed towards the box 112 to close the gate. The fluid pressure within the piston well and the pressure forces acting on the piston are increased, and the adjustment vane is moved towards its closed position.

Referring to FIG. 4, moving to the top of the central control unit, a fluid pressure control unit 104 extends from the top 119 of the box 112. The fluid pressure unit communicates with the fluid reservoir 113 via a taped hole 151 disposed through the top wall 119. The pressure control unit functions to control the fluid pressure in the fluid reservoir.

The unit is configured such that the operator may manually adjust the operational fluid pressure of the fluid reservoir during maintenance of the aircraft.

In accordance with a first exemplary embodiment, the pressure control unit 104 comprises a substantially rectangular structure 150 which includes a substructure 152 having a hollow interior that receives fuel passing from the fluid reservoir via the taped hole, and a plug 156 consisting of a stem 157 and a beveled nose 158 adapted to be engageable with the tapped hole. The stem is a threaded member that extends through and engages a hermetically sealed threaded bore 153 centrally disposed through the top of the substructure.

The stem includes a notch 155 disposed on a terminal end of the stem upwardly extending from the substructure that is adapted to receive a screw driver. When the stem is rotated clockwise it screws within the threaded bore and translates the beveled nose to engage the taped hole 151. This impedes fuel from passing into the interior of the substructure 152, consequently and increasing the fluid pressure in the fluid reservoir, creating increased pressure forces that act on the piston to move the adjustment vane. This provides the mechanical controller 100 with a quicker response (meaning that the piston will react or translate quicker) to changes in fluid pressure in the fluid reservoir.

In a similar fashion, when the stem 157 is rotated counter clockwise the stem unthreads from the threaded bore. This translates the beveled nose away from the tapped hole 151. Accordingly, fuel is allowed to pass from the fluid reservoir into the substructure's hollow interior. The fluid pressure in the fluid reservoir is decreased and the pressure forces that act on the piston to translate the adjustment vane are reduced. This provides the mechanical controller 100 with a more relaxed response to changes in fluid pressure in the fluid reservoir.

Fuel passing through the interior of the substructure 152 is returned to the high pressure fuel pump via a low pressure line 166 connected to the top of the substructure to maintain the high pressure line and prohibit air bubbles from forming in the fuel lines while the engine is running.

Referring to FIG. 3, the fluid pressure in the fluid reservoir 113 is equalized by the hydraulic transmitter 106. The hydraulic transmitter communicates with the reservoir via a fluid conduit 170 connected to the top 119 of the box 112. The fluid conduit provides an additional passage whereby high pressure fuel is allowed to pass from the fluid reservoir 113. The fluid conduit 170 is preferably constructed to receive a considerable volume of fuel passing from the fluid reservoir, as the hydraulic transmitter serves as the primary equalizing means for the fluid reservoir. The hydraulic transmitter is coupled to the high pressure compressor and equalizes the fluid reservoir according the shaft speed of the high pressure compressor, as will be explained in further detail below.

In an exemplary embodiment, the hydraulic transmitter 106 consists of a receptacle 172 that receives a rotating shaft 174 through a first sidewall 173 and a low pressure fuel hose 176 through an opposing second sidewall 171. The rotating shaft 174 is coupled to the shaft of the high pressure compressor at one end and terminates within the receptacle at a second end. Connected to a first end of the low pressure fuel hose is a cylindrical baffle 178 that is disposed within the receptacle. The receptacle has a substantially V-shaped profile and is symmetrical about the terminating end of the rotating shaft. A bowl 179 defines the interior region of the baffle which includes a pair of flyballs 180 (best shown in FIG. 7) that are symmetrically displaced about the second end of the rotating shaft. The flyballs are coupled to the rotating shaft by a collapsible shield 181 that expands under centrifugal forces imposed on the flyballs that cause them to engage with the interior surface of the cylindrical baffle as the speed of the rotating shaft increases.

In accordance with the embodiment described above, fuel passing from the fluid reservoir 113 enters the receptacle 172 through a fluid conduit 170 connected to the top of the receptacle. When the high pressure compressor, which is coupled to the rotating shaft 174, is in the non-rotary state, i.e., when no air is passing through the engine, the flyballs 180 are contracted and spaced away from the cylindrical baffle. As such, fuel is allowed to pass into the bowl 179 and escape the receptacle through the low pressure fuel hose 176. Fuel escaping through the low pressure hose is returned to the high pressure fuel pump to maintain the high pressure line.

When the high pressure compressor is in a rotary state, as illustrated in FIG. 7, the flyballs expand by centrifugal forces in contact with the interior surfaces of the cylindrical baffle 178. The expanded collapsible shield 181 creates a barrier and prohibiting the fuel from passing into the bowl from escaping the receptacle through the low pressure hose. This causes the fuel passing into the receptacle 172 to pressurize the receptacle and create a pressure head, whereby additional fuel is prevented from passing into the receptacle. The pressure head generated within the receptacle 172 communicates downstream through the fluid conduit 170 and into the fluid reservoir 113 to retard the flow of fluid passing from the fluid reservoir into the fluid conduit, placing the fluid reservoir in equilibrium. As such, the fluid reservoir is equalized according the shaft speed of the high pressure compressor. Thus, at higher compressor shaft speeds, the fluid pressure within the fluid reservoir is equalized at a quicker rate and the response of the mechanical controller, due to changes in reservoir fluid pressure, sharply increases.

A secondary bleed line 182 is connected to the bottom of the receptacle 172 to relieve the pressure within the receptacle and return the escaping fuel back to the high pressure line.

With reference to FIG. 4, moving back to the central control unit, the fluid pressure within the fluid reservoir 113 is corrected according the engine altitude by an altitude adjustment device 190 extending from the sidewall 121 of the box 112. The altitude adjustment device comprises a compartment 192 having a partition 193 that separates the compartment into a first bin 194 and a second bin 196.

The first bin 194 is partially defined by the sidewall 121 of the box 112 and is in communication with the fluid reservoir 113 through a fuel port 198 disposed along the sidewall. The first bin 194 confines a first end 201 of a double sided piston 200 that is biased in abutment with the sidewall by a compression spring 199. The first end of the piston is configured such that it blocks the fuel port 198 to regulate the passage of fuel from the fluid reservoir into the interior of the first bin. When the fluid pressure within the fluid reservoir is sufficient in magnitude, the fuel passing through the fuel port acts on the first end of the piston to translate the piston away from the sidewall 121, allowing fuel to pass from the fluid reservoir into the first bin.

The second bin 196 confines a second end 203 of the double sided piston 200 and receives air from the high pressure compressor through an air line 202. The air entering into the second bin applies a pressure against the second end of the double ended piston 202 to urge the first end 201 of the double sided piston towards and in contact with the sidewall 121 with the assistance of the compression spring 199. Thus, as the density of the high pressure air varies in accordance with the engine altitude, the pressure applied to the second end of the piston will vary and the piston will be translated against the fluid pressure of the fluid reservoir according to the forces provided by the high pressure air. Simultaneously, the first end of the piston 200 will either move towards or away from the fuel port 198. As such, fuel within the fluid reservoir will either be allowed to pass into the interior of the first bin or be impeded from flowing therein. Thus, the fluid pressure within the fluid reservoir will change according to the position of the double sided piston 200.

Fuel entering into the first bin 194 will be passed to the high pressure line via a secondary low pressure line 204 connected to the top of the first bin 194. High pressure air entering the second bin 196 is passed from the bin via an air bled line 205 connected to eh top of the second bin.

Referring to FIG. 3, the mechanical controller 100 is also used to regulate the fuel passing through the fuel injectors providing fuel to the secondary combustion chamber 46. The fuel is regulated by a fuel valve 208 connected to the fuel line leading to the secondary combustion chamber at a location proximate the secondary combustion chamber. The fuel valve comprises a housing 210 that confines a shutter 212 and a resilient member 216. The shutter is a plate that is slidable within the housing 210 between an open position and a closed position. The shutter is configured to be received by the fuel line through a slit 211 along its tubular walls. The bias of the resilient member 216 acts against a bearing member 218 carried by the shutter to close the shutter by engaging a first end 213 of the shutter with a seat 220 located along the fuel line. In the closed position the shutter blocks the flow of the fuel to the secondary combustion chamber.

In the open position, the first end of the shutter 212 is disengaged from the seat 220 against the bias of the resilient member 216 by an actuator 214 connected to the shutter at a second end 215 opposite the first end 213 of the shutter. In the open position, fuel is allowed to pass through the fuel line 209 into the secondary combustion chamber. The actuator is coupled to the translator 144 such that the gate 134 of the fluid regulator 130 is simultaneously opened with the shutter of the fuel valve 208 (see FIG. 7). Accordingly, the operation of the mechanical controller 100 is initiated by the translator, which functions to regulate the fluid passing into the fluid reservoir, while simultaneously, regulating the fuel passing in to the fuel injectors of the secondary combustion chamber.

OPERATION

As described in FIGS. 1 and 2A, when in operation, the fan 28 draws atmospheric air into the engine 20 through the inlet 24 and generates axial fan flow which passes primarily through the core engine 30 and secondarily through the bypass duct 34. The secondary flow though the bypass duct cools the core engine and reunites with the primary flow at the nozzle 36.

The primary flow passing through the core engine enters the engine inlet 33 where it is compressed by the set of low and high pressure compressors 40 and 42. The compressed air passes from the compressors and enters the diffuser 60 which houses the primary and secondary combustion chambers 44 and 46. The primary combusor receives a primary portion of the compressed air, while the secondary combustion chamber receives a secondary portion of the compressed air. The compressed air is mixed with fuel and ignited within the primary and secondary combustion chambers to generate high pressure exhaust gases. The exhaust gases generated by the primary combustion chamber are directed to the high and low pressure turbines. The exhaust gases generated by the secondary combustion chambers are only directed to the low pressure turbine.

The amount of mechanical power, T, generated by the turbine blades is generally calculated as:

$$T=(F*r)(2\pi f) \text{ wherein,}$$

F is the amount of work force supplied by the exhaust gases passing from the combustion chamber, r is the effective point of application or moment arm of the work force F, and f is the frequency or rpm of the turbine blades. Thus, to increase the mechanical power provided turbine, you must either increase the amount of work force applied to the turbine blades by increasing the amount of fuel supplied to the combustors or increase the moment arm of the applied forces.

As shown in FIGS. 2A and 2B, exhaust gases passing from the primary combustion chamber drive the high pressure turbines and an interior annular area 270 (FIG. 2B) of the low pressure turbine blades, in accordance with conventional gas turbines. But exhaust gases passing from the secondary combustion chamber act on an outer annular area 272 of the low pressure turbine blades only. Because the engine of the present invention utilizes a second combustion chamber the internal area of the diffuser is larger than that of conventional engines utilizing one combustion chamber. Accordingly, the length of turbine blades of these engines must be sufficient increased to conform to such design. As such, the turbine blades of engines of the present invention are larger than those of conventional engines, thus the outer annular area represents such increase the turbine blade annular profile.

In addition, the secondary combutors of the present invention combust air with higher energy than conventional engine combustion chambers, as the secondary combustion chambers intakes high pressure air passing from the high pressure combustion chamber. Thus, the exhaust gases generated by the secondary combustion chamber provide more energy and apply more work force to the low pressure turbine blades than the exhaust gases generated by combustion chambers of the prior art.

Additionally, the exhaust gases from the secondary combustion chambers increase the moment arm 275 (FIG. 2B) applied to the turbine shaft. In the prior art, exhaust gases from the combustion chambers apply a constant force along the surface area of the low pressure turbine blades, generally having a locus of application 274 (FIG. 2B). But the exhaust gases generated by the secondary combustion chamber of the present invention apply a greater centralized force to an outer annular area of the low turbine blades to increase the effective locus of application 276 (FIG. 2B). Thus, the shaft horsepower of the low pressure turbine of the inventive engine is further increased. The improved shaft horsepower increases the fan blade speed and ultimately, increases the engine's air intake and thrust. As such, the engine of the present invention provides increased power at lower fuel consumption.

For example, as tabulated in FIG. 8A, a conventional engine consuming about 17,720 pounds of fuel per hour may produce approximately 47,000 pounds of thrust. Under these conditions, the low pressure compressor may operate at a compressor efficiency, which is defined as the amount of mechanical power generated by the turbines actually converted into compressor work, of about 86% and the high pressure compressor may operate at an efficiency of about 92%.

An engine in accordance with the embodiments of the present invention that consumes about 17,720 pounds of fuel per hour, may produce approximately 48,300 pounds of thrust and operate at efficiencies of about 90% for the low pressure compressor and about 88% for the high pressure compressor.

In like fashion, as tabulated in FIG. 8B, an engine in accordance with the embodiments of the present invention may reduce the amount of fuel consumed to about 16,490 pounds of fuel per hour while still producing the same amount of thrust, i.e. approximately 47,000 pounds, as the conventional engine described in this example.

An additional influence on engine power is the turbine inlet temperature. Exhaust gases coming from the combustion chamber enter the turbines at extremely high temperatures. While various cooling methods may be implemented in cooling the turbine blades, such as by convection cooling, impingement cooling or film cooling, it is preferred that the blades be cooled by transpiration cooling. According to this example, an air line is drawn from the high pressure compressor to a plurality of hollow passages extending tangentially within the blades of the low and high pressure turbines. The turbine blades are constructed with porous walls such that the cool air being passed through the hollow passages are allowed to escape through the pores, providing a continuous cooling jacket around the blades.

As described above, the pilot may control the amount high pressure gas entering the secondary combustion chamber by activating the mechanical controller 100. In its "first mode", the control lever 160 in the cockpit is at a "zero" position, as shown in FIG. 9A, where the lever is at it's most forward clockwise position and the gate 134 of the central control unit 102 is in its closed position, preventing fuel from passing from the entrance 128 to the fluid reservoir 113. In the first mode, or zero position, the fluid pressure built up in the entrance and the piston well is sufficient to cause the piston to translate against the spring bias away from the side panel of the piston cell. The translation of the piston operates the linkage 122, which in turn, moves the adjustment vane 250 relative the inlet orifices to regulate the amount of high pressure air passing into the secondary combustion chamber. In a preferred embodiment, the vane is constructed to allow a minimum of approximately two percent (2%) of the total air stream passing from the high pressure compressor to enter the secondary combustion chamber in the zero mode.

If the pilot desires additional performance, the control lever may be rotated counterclockwise into a "second mode", or three-fourths position, between the zero position and its furthermost counterclockwise position, as will be discussed below. In the three-fourths position, as shown in FIG. 9B, the control lever is rotated counterclockwise to disengage the gate 134 from the seal in piston well and allow a first predetermined portion of fuel to pass from the entrance 128 into the fluid reservoir. As such, the fluid pressure in the entrance and the piston well is reduced to a level slightly below the force needed to overcome the bias of the spring 120. In this mode, the piston 118 is urged towards the side panel of the piston cell, but the fluid pressure in the piston well is sufficient to retain the piston at a position between its extended position proximate the side panel, and its compressed position, proximate the sidewall 123 of the box 112. The translation of the piston operates the linkage 122, which in turn, moves the vane 250 to a position to increase the effective diameter of the inlet orifices 86 of the secondary combustion chamber, thus allowing an increased amount of high pressure air pass into the secondary combustion chamber.

To achieve "maximum" performance, the pilot may rotate the control lever conterclockwise into a "third mode", or full position shown in FIG. 9C, which is the lever's furthermost counterclockwise position. In the full position, the control lever is rotated further counterclockwise to translate the gate 134 further away from seat in the piston cell to allow a second predetermined portion of fuel, larger than the first predetermined portion, to pass from the entrance to the fluid reservoir. As such, the fluid pressure in the fluid reservoir and the piston well is further reduced to a level insufficient to overcome the bias of the spring 120. In this mode, the piston 118 is urged into contact with the side panel 126. The additional translation of the piston operates the linkage 122, which in turn, moves the vane 246 to a position to further increase the effective diameter of the inlet orifices 86 of the secondary combustion chamber and allow the maximum amount of high pressure air to pass into the secondary combustion chamber.

Simultaneous with the pilot adjusting the vane position, the shutter 212 of the fuel valve 208 is actuated to regulate the amount of fuel passing to a fuel control unit (not shown) of the secondary combustion chamber. The fuel control unit determines the amount of fuel to pass to the fuel injectors based on a pressure reading of the high pressure air at the inlet 73 of the secondary annular flow 84. Accordingly, as shown in FIGS. 9A though 9C, in the "zero" and "three-fourths" positions the shutter is in its closed position and impedes the passage of fuel through the fuel line 209 to the fuel control unit. Fuel is prohibited from passing to the secondary combustion chamber at these positions to prevent the second combustion chamber from "hot starting," which occurs when fuel is burned without a sufficient amount of air to create a proper stoichiometric fuel-air mixture. Thus, air is initially allowed to pass into secondary combustion chamber before the fuel is introduced. Finally, in the "full position," the translators actuates the shutter to an "open" position to allow the fuel to pass through the fuel line to fuel control unit.

Moreover, during the operation of the aircraft engine the pressure within the fluid reservoir is being corrected and placed into equilibrium by the hydraulic transmitter 106 and the altitude compensator 190 according to the shaft speed of the high pressure compressor and the engine altitude.

Figure 10:
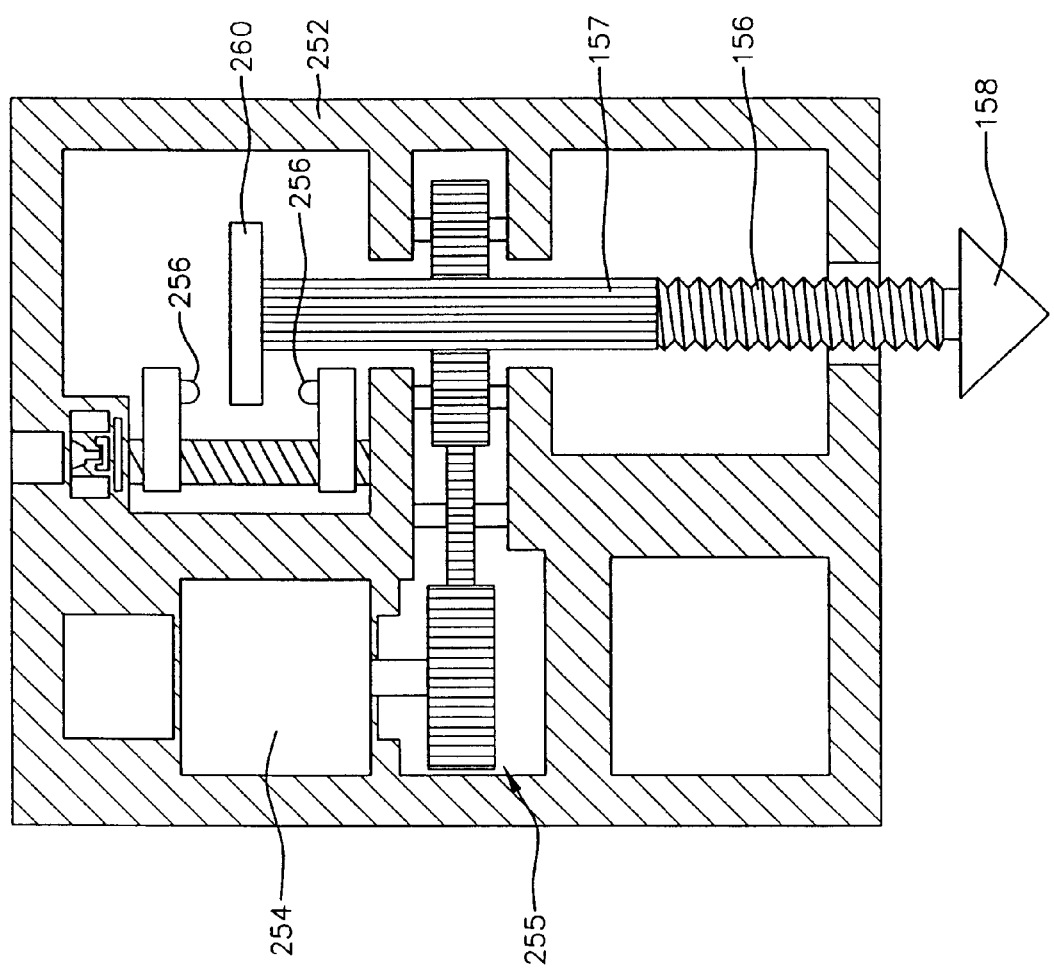
FIG. 10 is a fragmentary sectional view of a second embodiment fluid pressure control unit of the central control unit in FIG. 4.
Figure 11A:
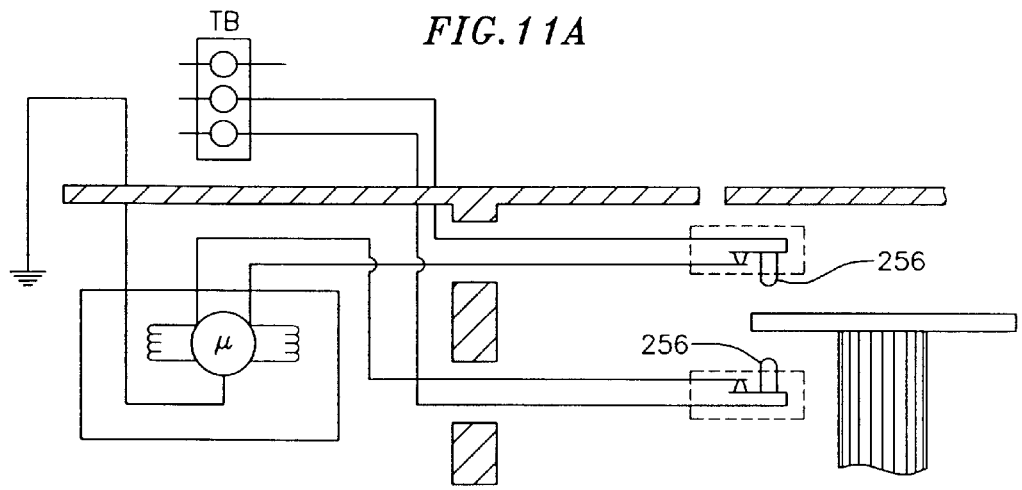
FIGS. 11A and 11B are a simplified plan view and a simplified schematic view, respectively, of an electrical circuit used in conjunction with the fluid pressure control unit in FIG. 10.
Figure 11B:
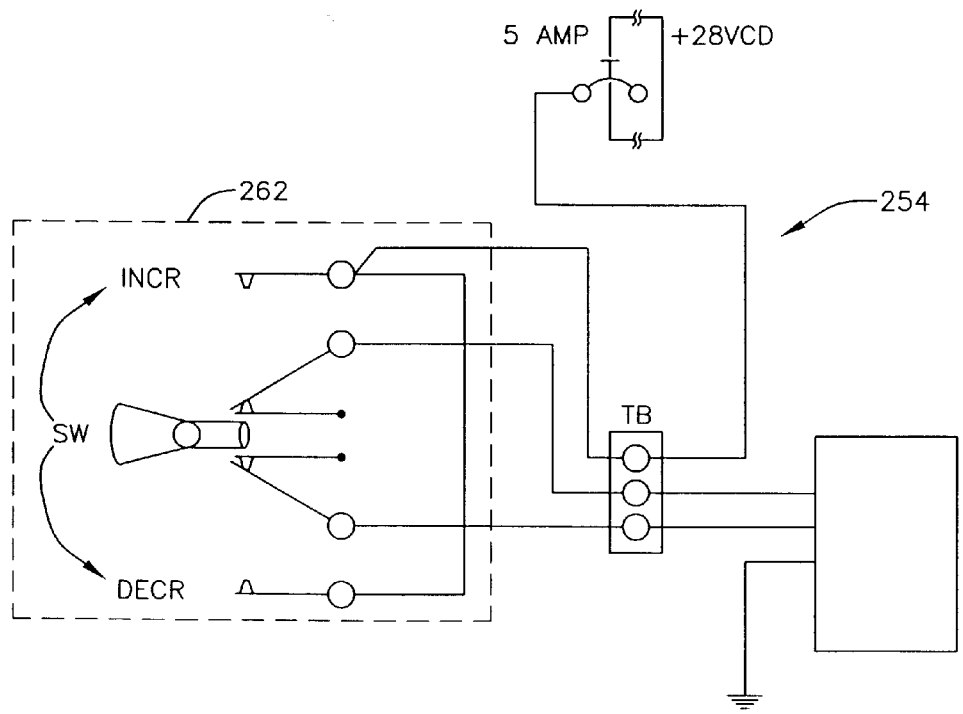

In a second exemplary embodiment, as depicted in FIGS. 10, 11A and 11B, the plug 156 of pressure control unit may be actuated by electric means. In this embodiment, the pressure control unit comprises a second substructure 252 that extends from the substructure 152 (see FIG. 3). The second substructure includes a reversible motor 254 (FIG. 11B) that is coupled to a series of planetary gears 255. The planetary gears engage a threaded portion of the stem 157 of the plug 156 to engage and disengage the beveled nose 158 from the tapered hole 151 (FIG. 4). The second structure 252 also includes a pair of switches 256 that are coupled to the motor to limit the translation of the plug and stop the motor when the plug has reached its maximum position of engagement or disengagement from the tapered hole. The switches are engaged by a member 260 attached to an end of the plug positioned between two switches. When the member translates in one direction to trigger one of the switches, the motor stops and then changes direction to move the member in a second direction.

In accordance with this embodiment, an electrical switch 262 (shown in FIG. 11B) is provided in the aircraft cockpit and is coupled to the reversible motor 254. By moving the switch the reversible motor moves the plug, consequently allowing the pilot, by moving the switch to vary the response of the mechanical controller by varying the fluid pressure in the fluid reservoir.

Figure 12:
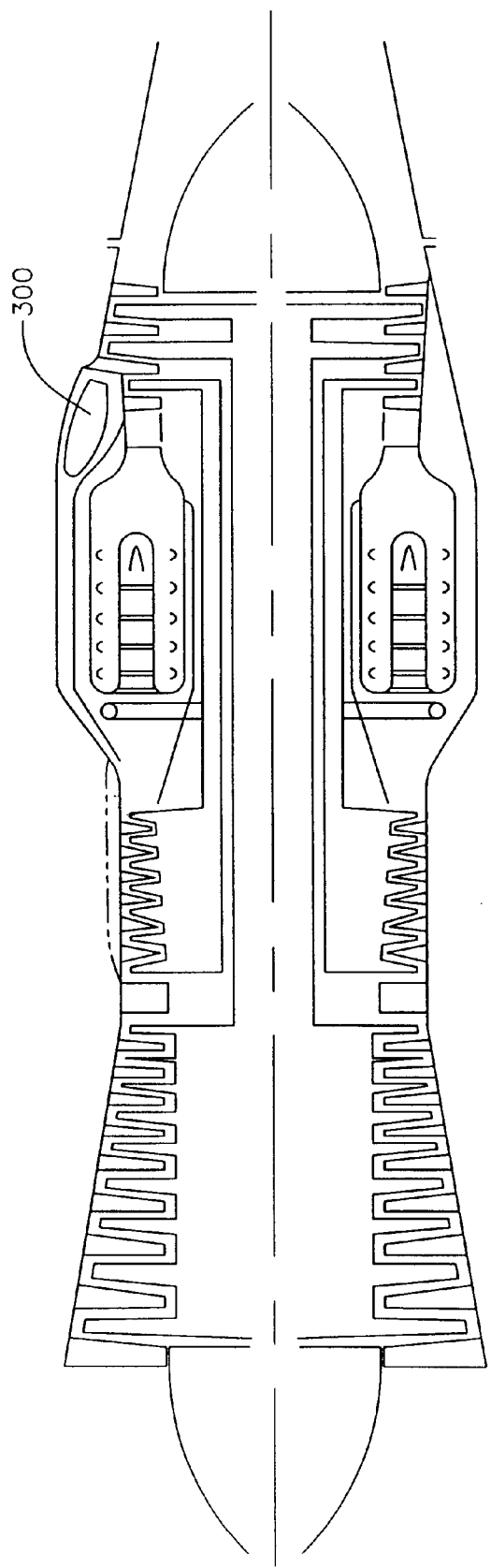
FIG. 12 is a cross-sectional side view of a second embodiment gas turbine engine incorporating a secondary combustion chamber according to the principles of this invention.

While the example embodiments of the present invention is described in use with a turbofan engine, it should be understood by one skilled in the art that the present invention may be used in any gas turbine engine. For example, a turbojet engine may be modified to incorporate a second combustion chamber 300 as shown in FIG. 12.

The preceding description has been presented with reference to presently preferred embodiments of the invention. Workers skilled in the art and technology to which this invention pertains will appreciate that alterations and changes in the described structure may be practiced without meaningfully departing from the principal, spirit and scope of this invention.

Accordingly, the foregoing description should not be read as pertaining only to the precise structures described and illustrated in the accompanying drawings, but rather should be read consistent with and as support to the following claims which are to have their fullest and fair scope.

What is claimed is:

1. An engine comprising:
   a casing having an inlet and an outlet downstream of the inlet;
   a compressor rotatably disposed within the casing generating compressed gas;
   a primary combustion chamber disposed within the casing downstream of the compressor receiving a primary portion of the compressed gas and generating primary exhaust gases;
   a secondary combustion chamber disposed within the casing downstream of the compressor receiving a secondary portion of the compressed gas and generating secondary exhaust gases;
   a turbine downstream from the first combustion chamber receiving only the primary exhaust gases; and
   a second turbine having a plurality of turbine blades downstream of the first and second combustion chambers and coupled to an intake fan disposed upstream of the compressor.

2. The engine of claim 1, wherein the secondary exhaust gases are exhausted from the secondary combustion chamber downstream from the turbine.

3. The engine of claim 1, wherein the primary exhaust gases are directed along a first path to an inner annular area of the turbine blades and the secondary exhaust gases are directed along a second path different from the first path to an outer annular area of the turbine blades.

4. The engine of claim 1, wherein the engine further comprises a means for regulating the amount of the secondary portion of compressed gas received by the secondary combustion chamber.

5. The engine of claim 4, wherein the regulating means is an adjustable vane disposed at an inlet to the secondary combustion chamber and actuated by a mechanical controller.

6. A method of improving engine efficiency in an engine comprising a compressor, a first combustion chamber, a second combustion chamber, and a turbine at least a portion of which is downstream of the first and second combustion chambers, the method comprising the steps of:
   passing gas through the compressor to generate compressed gas;
   passing a first portion of the compressed gas to a first combustion chamber;
   passing a second portion of the compressed gas to a second combustion chamber;
   adding fuel to the first portion of compressed gas in the first combustion chamber to form a first mixture;
   igniting the first mixture to generate a first portion of exhaust gases;
   adding fuel to the second portion of compressed gas in the second combustion chamber to form a second mixture;
   igniting the second mixture to generate a second portion of exhaust gases; and
   directing the first portion of exhaust gases to an inner annular area of the turbine.

7. The method of claim 6, further comprising the step of directing the second portion of exhaust gases along a second path different from the first path to an outer annular area of the turbine.

8. The method of claim 6, further comprising the step of varying the amount the second portion of compressed gas received by the second combustion chamber.

9. The method of claim 6, wherein the step of passing a second portion of compressed gas comprises passing a minimum of about 2% of the total portion of compressed gas to the second combustion chamber.

10. An engine comprising:
    a casing having an inlet and an outlet downstream of the inlet;
    a compressor rotatably disposed within the casing generating compressed gas;
    a primary combustion chamber disposed within the casing downstream of the compressor receiving a primary portion of the compressed gas and generating primary exhaust gases;
    a secondary combustion chamber disposed within the casing downstream of the compressor receiving a secondary portion of the compressed gas and generating secondary exhaust gases;
    a first turbine downstream from the first combustion chamber receiving only the primary exhaust gases; and
    a second turbine downstream of the first and second combustion chambers, the second turbine having a plurality of turbine blades, wherein the primary exhaust gases are directed along a first path toward an inner annular area of the turbine blades and the secondary exhaust gases are directed along a second path different from the first path toward an outer annular area of the turbine blades.

11. The engine of claim 10, wherein the secondary exhaust gases are exhausted from the secondary combustion chamber downstream from the first turbine.

12. The engine of claim 11, wherein the second turbine is coupled to an intake fan disposed upstream of the compressor.

13. The engine of claim 10, wherein the engine further comprises an adjustable vane disposed at an inlet to the secondary combustion chamber for controlling the amount of the secondary portion of compressed gas received by the secondary combustion chamber.

14. The engine of claim 10, wherein the primary exhaust gases are guided away from the secondary combustion chamber, and wherein the secondary exhaust gases are exhausted downstream of the primary combustion chamber.

15. A method of improving engine efficiency in an engine comprising the steps of:
   passing gas through a compressor to generate compressed gas;
   dividing the compressed gas into a first portion and a second portion;
   passing the first portion of the compressed gas to a first combustion chamber;
   passing a second portion of the compressed gas to a second combustion chamber;
   adding fuel to the first portion of compressed gas in the first combustion chamber to form a first mixture;
   igniting the first mixture to generate first combustion chamber exhaust gases;
   adding fuel to the second portion of compressed gas in the second combustion chamber to form a second mixture;
   igniting the second mixture to generate second combustion chamber exhaust gases, said second combustion chamber exhaust gases being exhausted downstream of the first combustion chamber;
   directing the first combustion chamber exhaust gases along a first path toward an inner annular area of a turbine; and
   directing the second combustion chamber exhaust gases along a second path different from the first path toward an outer annular area of the turbine.

16. The method of claim 15, further comprising the step of varying the amount the second portion of compressed gas received by the second combustion chamber.

17. The method of claim 15 further comprising the step of guiding said first combustion chamber exhaust gases away from said second combustion chamber.

18. An engine comprising:
   a casing having an inlet and an outlet downstream of the inlet;
   a first compressor rotatably disposed within the casing generating compressed gas;
   a second compressor upstream of the first compressor;
   a first turbine downstream of the first compressor and coupled to the first compressor;
   a second turbine downstream of the first turbine and coupled to the second compressor, wherein the second turbine comprises a plurality of turbine blades;
   a primary combustion chamber disposed within the casing downstream of the first compressor receiving a first portion of the compressed gas and generating primary exhaust gases, said primary exhaust gases being guided to the first turbine and to an inner annular area of second turbine blades along a first path; and
   a secondary combustion chamber disposed within the casing downstream of the first compressor and receiving a second portion of the compressed gas and generating secondary exhaust gases, wherein the secondary exhaust gases are exhausted downstream of the primary combustion chamber and the first turbine, and wherein the secondary exhaust gases are guided along a second path different from the first path to an outer annular area of the second turbine blades.

19. The engine of claim 17 wherein the primary exhaust gases are guided away from the secondary combustion chamber.

* * * * *